(12) United States Patent
He et al.

(10) Patent No.: US 11,591,890 B2
(45) Date of Patent: Feb. 28, 2023

(54) METHOD AND APPARATUS FOR PRODUCING HYDROCARBON

(71) Applicants: Zhi Yong He, Cypress, TX (US); Yuh Loh, Cypress, TX (US); Zhihui Zhang, Katy, TX (US)

(72) Inventors: Zhi Yong He, Cypress, TX (US); Yuh Loh, Cypress, TX (US); Zhihui Zhang, Katy, TX (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 71 days.

(21) Appl. No.: 17/154,665

(22) Filed: Jan. 21, 2021

(65) Prior Publication Data
US 2022/0228472 A1    Jul. 21, 2022

(51) Int. Cl.
| | |
|---|---|
| *E21B 43/38* | (2006.01) |
| *E21B 43/08* | (2006.01) |
| *C09K 8/58* | (2006.01) |
| *C09D 5/00* | (2006.01) |

(52) U.S. Cl.
CPC ............... *E21B 43/38* (2013.01); *C09D 5/00* (2013.01); *C09K 8/58* (2013.01); *E21B 43/08* (2013.01)

(58) Field of Classification Search
CPC ........ E21B 43/38; E21B 43/385; E21B 43/35; E21B 43/40; E21B 43/34; E21B 43/36; E21B 43/08; E21B 43/28; E21B 43/12; C09K 8/58
See application file for complete search history.

(56) References Cited

U.S. PATENT DOCUMENTS

| | | | |
|---|---|---|---|
| 6,000,468 A * | 12/1999 | Pringle | E21B 47/10 137/101.21 |
| 8,616,272 B2 | 12/2013 | Mazyar et al. | |
| 10,787,872 B1 * | 9/2020 | Jamison | E21B 21/068 |
| 2006/0037746 A1 * | 2/2006 | Wright | E21B 43/385 166/228 |
| 2007/0012444 A1 * | 1/2007 | Horgan | E21B 43/088 166/227 |
| 2011/0297617 A1 | 12/2011 | Mazyar | |
| 2012/0285680 A1 * | 11/2012 | Kumar | E21B 43/38 166/264 |
| 2015/0053417 A1 * | 2/2015 | Holderman | E21B 34/08 166/373 |

(Continued)

FOREIGN PATENT DOCUMENTS

CN         109942052 A  *  6/2019

OTHER PUBLICATIONS

Jimenez-Pardo, et al. Hydrophilic Self-Replenishing Coatings with Long-Term Water Stability for Anti-Fouling Applications, May 14, 2018, Coatings, 8, 184 (Year: 2018).*

(Continued)

*Primary Examiner* — Angela M DiTrani Leff
(74) *Attorney, Agent, or Firm* — Cantor Colburn LLP

(57) ABSTRACT

A hydrocarbon production system comprises a base pipe; and a separator having a body with an inner surface defining a conduit, the inner surface being coated with a polymer blend comprising a hydrophilic component and a hydrophobic component, an inlet, a water outlet, and an oil outlet fluidly coupled to the base pipe.

15 Claims, 2 Drawing Sheets

(56) References Cited

U.S. PATENT DOCUMENTS

2019/0040714 A1* 2/2019 Fripp .................... E21B 43/084
2021/0180440 A1* 6/2021 Lo Cascio ............ E21B 43/385

OTHER PUBLICATIONS

Translation of CN 109942052 A (Year: 2019).*
Li, J. et al., "Polymeric materials with switchable superwettability for controllable oil/water separation: A comprehensive review", Progress in Polymer Science 87 (2018) 1-33.
Zhu, Y., et al. "Recent progress in developing advanced membranes for emulsified oil/water separation" NPG Asia Materials (2014) 6, e101; doi:10 1038/am.2014.23; published online May 23, 2014, 11 pages.

* cited by examiner

METHOD AND APPARATUS FOR PRODUCING HYDROCARBON

BACKGROUND

Downhole completions are often used to produce or harvest fluids, e.g., hydrocarbons, from subterranean reservoirs, formations, or production zones. Undesirable fluids, e.g., water or brine, also are often located downhole. Moreover, downhole fluids can also contain particulates such as fines. As a result, flow control devices and oil/water separators have been contemplated for limiting production of the undesirable fluids or particulates in order to maximize the yield of the desirable fluids. Although various methods and devices have been developed, advances in flow control devices, and other systems and methods for limiting water, brine, or undesirable particles into a downhole production assembly are well received by the industry.

BRIEF DESCRIPTION

A hydrocarbon production system comprises a base pipe; and a separator having a body with an inner surface defining a conduit, the inner surface being coated with a polymer blend comprising a hydrophilic component and a hydrophobic component, an inlet, a water outlet, and an oil outlet fluidly coupled to the base pipe.

A method of producing hydrocarbon from a subterranean formation comprises disposing the above-described system in a well penetrating a subterranean formation; feeding a production fluid into the separator through the inlet, the production fluid comprising an oil component and an aqueous component; conveying the oil component to the base pipe via the oil outlet; and allowing the water component of the production fluid to exit the separator via the water outlet.

BRIEF DESCRIPTION OF THE DRAWINGS

The following description should not be considered limiting in any way. With reference to the accompanying drawings, like elements are numbered alike.

DETAILED DESCRIPTION

An efficient method of producing hydrocarbon from a subterranean formation is disclosed by using a system including a separator having an inner surface coated with a polymer blend comprising a hydrophilic component and a hydrophobic component. When the separator is contacted with a flow of a production fluid having an aqueous component and an oil component, the separator allows the oil component to flow to a base pipe while impeding the flow of the aqueous component and allowing the aqueous component to exit the separator via a water outlet.

Figure 1:
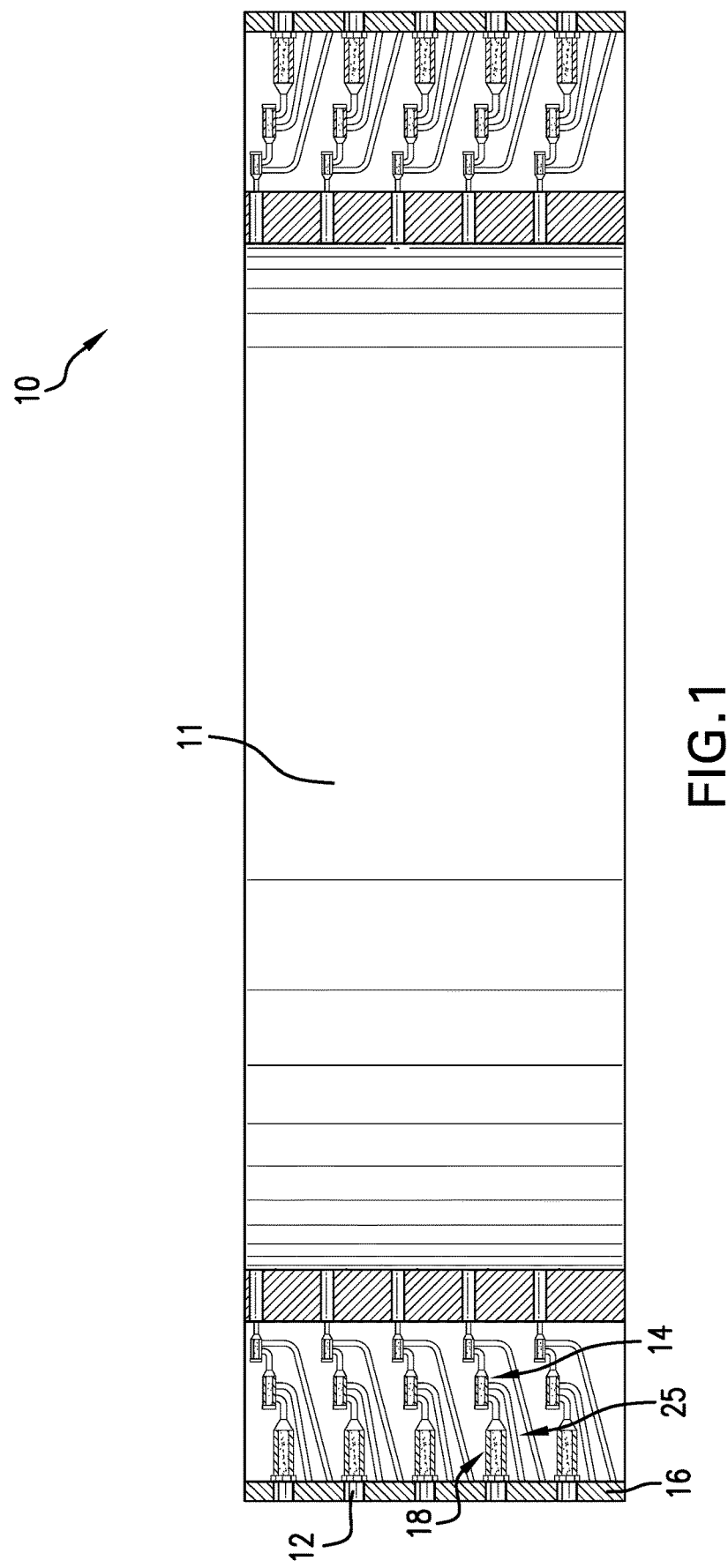
FIG. 1 illustrates a hydrocarbon production system according to an embodiment of the disclosure.
Figure 2:
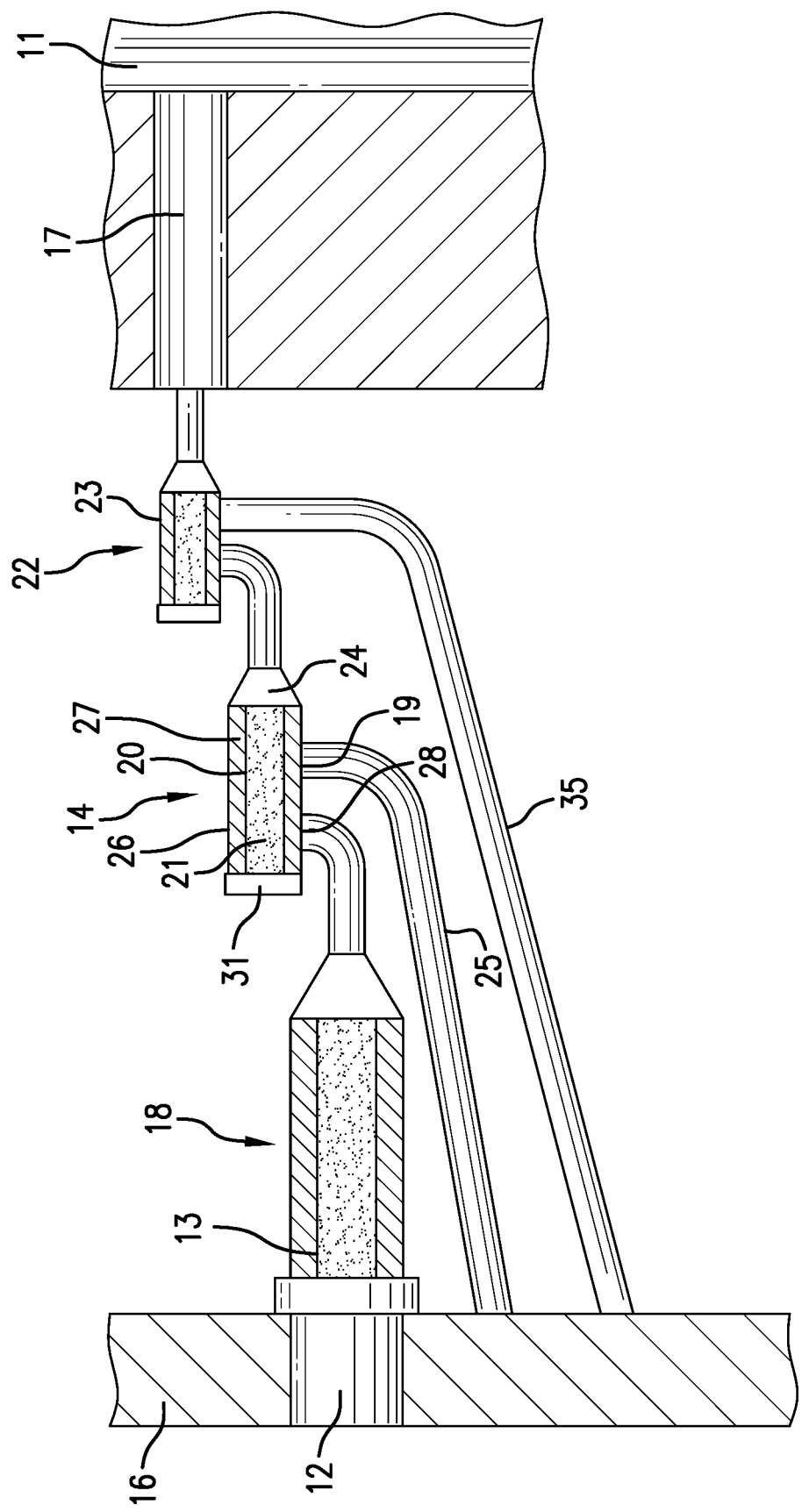
FIG. 2 is an enlarged partial view of the hydrocarbon production system illustrated in FIG. 1.

Referring to FIGS. 1 and 2, a hydrocarbon production system (10) comprises a base pipe (11); and a separator (14) having a body (26) with an inner surface (27) defining a conduit (21), an inlet (28), a water outlet (19), and an oil outlet (24) fluidly coupled to the base pipe (11). The inner surface (27) of the separator (14) is coated with a polymer blend (20) comprising a hydrophilic component and a hydrophobic component.

As used herein, "hydrophobic" refer to a material, a surface or coating that is difficult to wet by water because of its chemical composition and/or geometric microstructure. Hydrophobic materials/coatings as disclosed herein have at least one of the following characteristics: a static contact angle greater than about 120° or greater than about 130°; a contact angle hysteresis less than about 30° or less than about 20°; or a roll-off angle less than about 20° or less than about 10°. In an aspect, the hydrophobic coatings have two of these characteristics. In another aspect, the hydrophobic materials/coatings have all three characteristics.

"Hydrophilic" refers to a material, a surface or coating that attracts water and allows wetting of the material/surface/coating. A surface or coating formed from a hydrophilic material can have a droplet contact angle measurement of less than 90 degrees.

The hydrophobic component in the polymer blend includes at least one of polyhedral oligomeric silsesquioxane having fluorinated alkyl groups (also referred to as fluorinated POSS); a salt of perfuorooctanoate such as sodium perfuorooctanoate; polyvinylidene fluoride (PVDF); polytetrafluoroethylene (PTFE); perfluoroalkoxy alkanes (PFA); or polysulfones.

The fluorinated POSS has a structure represented by Formula (I)

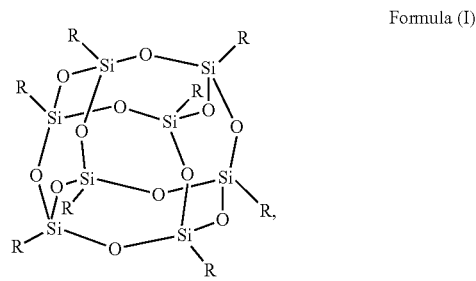

Formula (I)

wherein each R is independently hydrogen or a fluorinated alkyl with the formula —$C_xH_yF_z$, x is 1 to 20 or 3 to 15, y is greater than 0, and y+z is 2x+1, provided that at least one R is a fluorinated alkyl group. Preferably z is greater than or equal to 3. The fluorinated alkyl group can include at least one, at least two, at least three, or at least four perfluorinated aliphatic carbons in a linear sequence. The fluorinated alkyl group can also terminate with a trifluoromethyl group (—CF3). R group can be —$CH_2$—$CH_2$—$CF_3$ (fluoropropyl or FP), —$CH_2$—$CH_2$—$CF_2$—$CF_2$—$CF_2$—$CF_3$ (fluorohexyl or FH), —$CH_2$—$CH_2$—$CF_2$—$CF_2$—$CF_2$—$CF_2$—$CF_2$—$CF_3$ (fluorooctyl, FO), and —$CH_2$—$CH_2$—$CF_2$—$CF_2$—$CF_2$—$CF_2$—$CF_2$—$CF_2$—$CF_3$ (fluorodecyl, FD). Examples of fluorinated POSS include octakis(1H,1H,2H,2H-heptadecafluorodecyl) polyhedral oligomeric silsesquioxane ("FD POSS"), fluorohexyl polyhedral oligomeric silsesquioxane ("FH POSS"), fluorooctyl polyhedral oligomeric silsesquioxane ("FO POSS"), and fluoropropyl polyhedral oligomeric silsesquioxane ("FP POSS").

The hydrophilic component in the polymer blend includes at least one of a polymer with OH group such as polyvinyl alcohol and poly(2-hydroxy-ethyl methacrylate); a polyether such as polypropylene glycol, poly(ethylene glycol), poly(ethylene glycol) methyl ether methacrylate, and polyethylene glycol diacrylate (PEGDA); poly(acrylic acid); a zwitterionic polyelectrolyte polymer; polyacrylamide (PAM); or poly(diallyldimethylammonium chloride). The hydrophilic component can optionally be crosslinked.

The zwitterionic polyelectrolyte polymer comprises a repeat unit that has both a negative charge and a positive charge. An example of a zwitterionic polyelectrolyte polymer is poly(3-(N-2-methacryloxyethyl-N,N-dimethyl) ammonato propanesultone) (PMAPS)

Specific examples of the polymer blend include a blend of fluorinated POSS and polyethylene glycol diacrylate (PEGDA) or a blend of sodium perfuorooctanoate and poly(diallyldimethylammonium chloride).

The hydrophilic component and the hydrophobic component in the polymer blend can have a molar ratio of about 1:10 to about 10:1, about 1:5 to about 5:1, or about 2:1 to about 2:1.

The polymer blend forms a separator coating. The coating can have a thickness of about 5 to about 50 microns, specifically about 5 microns to about 20 microns.

The system (10) can further comprise a water pipe (25) connected to the water outlet (19) of the separator (14). The water pipe (25) can be coated with a hydrophilic coating.

Hydrophilic polymers useful as polymeric materials for the hydrophilic coating can be prepared from an acrylic, vinyl, ether monomers or functional groups, or combinations of any one or more of these types of monomers or groups. Acrylic monomers include, for example, methacrylate, methyl methacrylate, hydroxyethyl methacrylate, hydroxyethyl acrylate, methacrylic acid, acrylic acid, glycerol acrylate, glycerol methacrylate, acrylamide, methacrylamide, dimethylacrylamide (DMA), and derivatives and/or mixtures of any of these. Vinyl monomers include, for example, vinyl acetate, vinylpyrrolidone, vinyl alcohol, and derivatives of any of these. Polyether monomers include, for example, ethylene oxide, propylene oxide, butylene oxide, and derivatives of any of these. Examples of polymers that can be formed from these monomers include poly(acrylamide), poly(methacrylamide), poly(vinylpyrrolidone), poly (acrylic acid), poly(ethylene glycol), poly(vinyl alcohol), and polyhydroxyethylmethacrylate. Examples of hydrophilic copolymers include, for example, methyl vinyl ether/ maleic anhydride copolymers and a copolymer of vinyl pyrrolidone and acrylamide monomers. Examples of acrylamide monomers include (meth)acrylamide and (meth) acrylamide derivatives, such as alkyl(meth)acrylamide, as exemplified by dimethylacrylamide, and aminoalkyl(meth) acrylamide, as exemplified by aminopropylmethacrylamide and dimethylaminopropylmethacrylamide. Mixtures of homopolymers and/or copolymers can be used.

The system (10) can further comprise a first tubular member (18) connected to the inlet (28) of the separator (14), a second tubular member (22) connecting the oil outlet (24) of the separator (14) to an opening (17) on the base pipe (11), or a combination thereof. The first tubular member (18), the second tubular member (22), or both can have an inner surface coated with a hydrophobic coating (13, 23). The second tubular member (22) and the separator (14) can also have a back plate (31). Optionally the second tubular member (22) also includes a water pipe (35) that can remove additional aqueous component if present before the downhole fluid is conveyed to the base pipe (11).

Optionally the system (10) further comprises a screen (16) radially outwardly disposed of the base pipe (11), wherein the separator (14) is disposed between the screen (16) and the base pipe (11). The screen (16) has a substrate and a hydrophobic coating. The size and shape of the screen substrate are not particularly limited. In an embodiment, the substrate is a medium which is effective to filter formation solids from production fluid. Such screen substrate can be a slotted liner, or a wire wrapped screen. The screen substrate can also be in a mesh form.

The hydrophobic coating on the first tubular member (18), the second tubular member (22), the screen (16), or a combination thereof can selectively impede the flow of the aqueous component of the production fluid without a pressure drop.

The hydrophobic coating can include at least one of fluoropolymers; silicones; polystyrene; poly n-alkyl methacrylates; or metal-fluoropolymer composites. Other known hydrophobic materials may also be used. Examples of fluoropolymers include polytetrafluoroethylene, polyethylenetetrafluoroethylene, fluorinated ethylene propylene copolymer, perfluoroalkoxy polymer, polyvinylidene fluoride, polyvinylfluoride, polychlorotrifluoroethylene, polyethylenechlorotrifluoroethylene, chlorotrifluoroethylenevinylidene fluoride, perfluoroelastomer, tetrafluoroethylene-propylene elastomeric copolymer, or perfluoropolyether.

An example of silicone is polydimethylsiloxane (PDMS). The alkyl chain of the poly n-alkyl methacrylate can be unsubstituted or substituted. Examples of poly n-alkyl methacrylates include poly(methyl methacrylate) where n=0 (PMMA); poly(hexadecyl acrylate) where n=15 (PHA); and poly(dodecyl methacrylate) where n=11 (PDMA); as well as poly(3-trimethoxysilylpropyl methacrylate (PTMSPMA).

The coating can be applied to the inner surface of the separator, the first and second tubular members and the sand screen substrate by any method known in the art, for example, by hand spraying, electro-spraying, dipping, thermal evaporation coating, or other coating techniques.

In use, a production fluid travels through the screen (16) via openings (12), flows into the first tubular member (18), and then the separator (14) through the inlet (28). The production fluids include an aqueous component and an oil component. The aqueous component contains water or brine. The oil component includes hydrocarbons.

The polymer blend coated on the inner surface of the separator (14) deters the flow of the aqueous component of the production fluid and allows the oil component of the production fluid continue to flow into the base pipe, either directly or through the second tubular member (22). The aqueous component of the production fluid can be removed from the separator (14) via water outlet (19). When the system includes a water pipe (25), the aqueous component in the production fluid can be returned to the formation via the water pipe.

Set forth below are various embodiments of the disclosure.

Embodiment 1. A hydrocarbon production system comprising a base pipe; and a separator having a body with an inner surface defining a conduit, the inner surface being coated with a polymer blend comprising a hydrophilic component and a hydrophobic component, an inlet, a water outlet, and an oil outlet fluidly coupled to the base pipe.

Embodiment 2. The system as in any prior embodiment, wherein the hydrophilic component comprises at least one of a polymer with OH group; a polyether; poly(acrylic acid); a zwitterionic polyelectrolyte polymer; polyacrylamide; or poly(diallyldimethylammonium chloride).

Embodiment 3. The system as in any prior embodiment, wherein the hydrophilic component comprises at least one of polyvinyl alcohol; poly(2-hydroxy-ethyl methacrylate); polypropylene glycol; poly(ethylene glycol); poly(ethylene glycol) methyl ether methacrylate; polyethylene glycol diacrylate; poly(acrylic acid); polyacrylamide; or poly(diallyldimethylammonium chloride).

Embodiment 4. The system as in any prior embodiment, wherein the hydrophobic component comprises at least one of polyhedral oligomeric silsesquioxane having fluorinated alkyl groups; a salt of perfuorooctanoate; polyvinylidene fluoride; polytetrafluoroethylene; a perfluoroalkoxy alkane; or a polysulfone.

Embodiment 5. The system as in any prior embodiment, wherein hydrophobic component comprises at least one of octakis(1H,1H,2H,2H-heptadecafluorodecyl) polyhedral oligomeric silsesquioxane; fluorohexyl polyhedral oligomeric silsesquioxane; fluorooctyl polyhedral oligomeric silsesquioxane; fluoropropyl polyhedral oligomeric silsesquioxane; sodium perfuorooctanoate; polyvinylidene fluoride; polytetrafluoroethylene; a perfluoroalkoxy alkane; or a polysulfone.

Embodiment 6. The system as in any prior embodiment, wherein the hydrophilic component and the hydrophobic component have a molar ratio of about 1:5 to about 5:1.

Embodiment 7. The system as in any prior embodiment, further comprising a water pipe connected to the water outlet of the separator.

Embodiment 8. The system as in any prior embodiment, wherein the water pipe is coated with a polymer of at least one of acrylic monomers, vinyl monomers, or ether monomers.

Embodiment 9. The system as in any prior embodiment, further comprising a first tubular member connected to the inlet of the separator, a second tubular member connecting the oil outlet of the separator to an opening on the base pipe, or a combination thereof.

Embodiment 10. The system as in any prior embodiment, wherein the first tubular member, the second tubular member, or both have an inner surface coated with a hydrophobic coating comprising at least one of a fluoropolymer; a silicone; polystyrene; a poly n-alkyl methacrylate; or a metal-fluoropolymer composite.

Embodiment 11. The system as in any prior embodiment, further comprising a screen radially outwardly disposed of the base pipe, wherein the separator is disposed between the screen and the base pipe.

Embodiment 12. The system as in any prior embodiment, wherein the screen has a substrate and a screen coating comprising at least one of a fluoropolymer; a silicone; polystyrene; a poly n-alkyl methacrylate; or a metal-fluoropolymer composite.

Embodiment 13. A method of producing hydrocarbon from a subterranean formation, the method comprising: disposing a system in a well penetrating a subterranean formation, the system comprising a base pipe, a separator having a body with an inner surface defining a conduit, the inner surface being coated with a polymer blend comprising a hydrophilic component and a hydrophobic component, an inlet, a water outlet, and an oil outlet fluidly coupled to the base pipe; feeding a production fluid into the separator through the inlet, the production fluid comprising an oil component and an aqueous component; conveying the oil component to the base pipe via the oil outlet; and allowing the aqueous component of the production fluid to exit the separator via the water outlet.

Embodiment 14. The method as in any prior embodiment, further comprising conveying the aqueous component of the production fluid in the separator to the formation via a water pipe connected to the water outlet of the separator.

Embodiment 15. The method as in any prior embodiment, wherein the aqueous component of the production fluid comprises brine.

Embodiment 16. The method as in any prior embodiment, wherein the hydrophilic component comprises at least one of a polymer with OH group; a polyether; poly(acrylic acid); a zwitterionic polyelectrolyte polymer; polyacrylamide; or poly(diallyldimethylammonium chloride).

Embodiment 17. The method as in any prior embodiment, wherein the hydrophobic component comprises at least one of polyhedral oligomeric silsesquioxane having fluorinated alkyl groups; a salt of perfuorooctanoate; polyvinylidene fluoride; polytetrafluoroethylene; a perfluoroalkoxy alkane; or a polysulfone.

Embodiment 18. The method as in any prior embodiment, wherein the hydrophilic component and the hydrophobic component have a molar ratio of about 1:5 to about 5:1.

Embodiment 19. The method as in any prior embodiment, further comprising contacting the production fluid with a first tubular member connected to the inlet of the separator; and selectively impeding the flow of the aqueous component of the production fluid.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity). As used herein, the size or average size of the particles refers to the largest dimension of the particles and can be determined by high resolution electron or atomic force microscope technology.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A hydrocarbon production system comprising
   a base pipe; and
   a separator having a body with an inner surface defining a conduit, the inner surface being coated with a polymer blend comprising a hydrophilic component and a hydrophobic component on a same surface, an inlet, a water outlet positioned on a side wall of the body, and an oil outlet fluidly coupled to the base pipe,
   wherein the hydrophilic component comprises at least one of a polymer with an OH group; a polyether; poly(acrylic acid); a zwitterionic polyelectrolyte polymer; polyacrylamide; or poly(diallyldimethylammonium chloride), and
   the hydrophobic component comprises at least one of a polyhedral oligomeric silsesquioxane having fluorinated alkyl groups; a salt of perfuorooctanoate; polyvinylidene fluoride; polytetrafluoroethylene; a perfluoroalkoxy alkane; or a polysulfone,
   wherein the hydrocarbon production system further comprises a screen radially outwardly disposed of the base pipe, wherein the separator is disposed between the screen and the base pipe.

2. The system of claim 1, wherein the hydrophilic component comprises the polymer with the OH group, and the polymer with the OH group comprises at least one of polyvinyl alcohol; poly(2-hydroxy-ethyl methacrylate); polypropylene glycol; or poly(ethylene glycol).

3. The system of claim 1, wherein hydrophobic component comprises the polyhedral oligomeric silsesquioxane having fluorinated alkyl groups, and the polyhedral oligomeric silsesquioxane having fluorinated alkyl groups comprises at least one of octakis(1H, 1H, 2H, 2H-heptadecafluorodecyl) polyhedral oligomeric silsesquioxane; fluorohexyl polyhedral oligomeric silsesquioxane; fluorooctyl polyhedral oligomeric silsesquioxane; or fluoropropyl polyhedral oligomeric silsesquioxane.

4. The system of claim 1, wherein the hydrophilic component and the hydrophobic component have a molar ratio of about 1:5 to about 5:1.

5. The system of claim 1, further comprising a water pipe connected to the water outlet of the separator.

6. The system of claim 5, wherein the water pipe is coated with a polymer of at least one of acrylic monomers, vinyl monomers, or ether monomers.

7. The system of claim 1, further comprising a first tubular member connected to the inlet of the separator, a second tubular member connecting the oil outlet of the separator to an opening on the base pipe, or a combination thereof.

8. The system of claim 7, wherein the first tubular member, the second tubular member, or both have an inner surface coated with a hydrophobic coating comprising at least one of a fluoropolymer; a silicone; polystyrene; a poly n-alkyl methacrylate; or a metal-fluoropolymer composite.

9. The system of claim 1, wherein the screen has a substrate and a screen coating comprising at least one of a fluoropolymer; a silicone; polystyrene; a poly n-alkyl methacrylate; or a metal-fluoropolymer composite.

10. A method of producing hydrocarbon from a subterranean formation, the method comprising:
disposing a system in a well penetrating a subterranean formation, the system comprising a base pipe, a separator having a body with an inner surface defining a conduit, the inner surface being coated with a polymer blend comprising a hydrophilic component and a hydrophobic component on a same surface, an inlet, a water outlet positioned on a side wall of the body, and an oil outlet fluidly coupled to the base pipe;
feeding a production fluid into the separator through the inlet, the production fluid comprising an oil component and an aqueous component;
conveying the oil component to the base pipe via the oil outlet; and
allowing the aqueous component of the production fluid to exit the separator via the water outlet,
wherein the hydrophilic component comprises at least one of a polymer with an OH group; a polyether; poly (acrylic acid); a zwitterionic polyelectrolyte polymer; polyacrylamide; or poly(diallyldimethylammonium chloride), and
the hydrophobic component comprises at least one of a polyhedral oligomeric silsesquioxane having fluorinated alkyl groups; a salt of perfuorooctanoate; polyvinylidene fluoride; polytetrafluoroethylene; a perfluoroalkoxy alkane; or a polysulfone.

11. The method of claim 10, further comprising conveying the aqueous component of the production fluid in the separator to the formation via a water pipe connected to the water outlet of the separator.

12. The method of claim 10, wherein the aqueous component of the production fluid comprises brine.

13. The method of claim 10, wherein the hydrophilic component and the hydrophobic component have a molar ratio of about 1:5 to about 5:1.

14. The method of claim 10, further comprising contacting the production fluid with a first tubular member connected to the inlet of the separator; and selectively impeding the flow of the aqueous component of the production fluid.

15. A hydrocarbon production system comprising
a base pipe; and
a separator having a body with an inner surface defining a conduit, the inner surface being coated with a polymer blend comprising a hydrophilic component and a hydrophobic component on a same surface, an inlet, a water outlet positioned on a side wall of the body, and an oil outlet fluidly coupled to the base pipe,
wherein the hydrophilic component comprises at least one of polyvinyl alcohol; poly(2-hydroxy-ethyl methacrylate); polypropylene glycol; poly(ethylene glycol); poly (ethylene glycol) methyl ether methacrylate; polyethylene glycol diacrylate; poly(acrylic acid); polyacrylamide; or poly(diallyldimethylammonium chloride), and
the hydrophobic component comprises at least one of at least one of octakis(1H, 1H, 2H, 2H-heptadecafluorodecyl) polyhedral oligomeric silsesquioxane; fluorohexyl polyhedral oligomeric silsesquioxane; fluorooctyl polyhedral oligomeric silsesquioxane; or fluoropropyl polyhedral oligomeric silsesquioxane; sodium perfuorooctanoate; polyvinylidene fluoride; polytetrafluoroethylene; a perfluoroalkoxy alkane; or a polysulfone, and
wherein the hydrocarbon production system further comprises a screen radially outwardly disposed of the base pipe, the separator is disposed between the screen and the base pipe.

\* \* \* \* \*